May 13, 1947. J. H. SPIRA 2,420,502
GEM GRINDING DEVICE
Filed Oct. 6, 1943
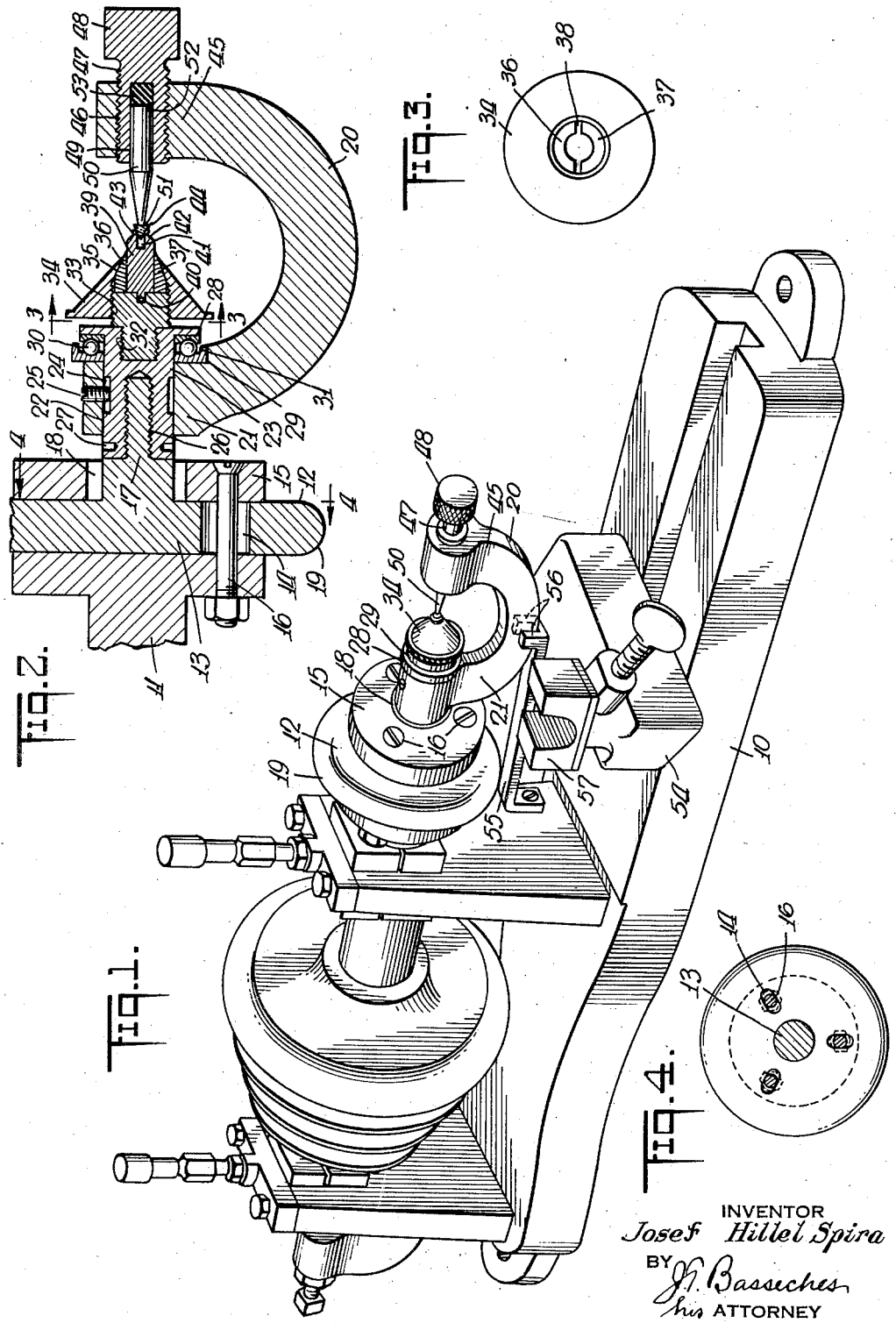
INVENTOR
Josef Hillel Spira
BY
N. Basseches
his ATTORNEY Patented May 13, 1947

2,420,502

UNITED STATES PATENT OFFICE 2,420,502

GEM GRINDING DEVICE

Josef Hillel Spira, New York, N. Y.

Application October 6, 1943, Serial No. 505,100

14 Claims. (Cl. 51—229)

This invention relates to a machine for bruting diamonds, and more particularly to a device for effecting the girdle-forming portion of the gem stock.

Heretofore, in devices known to me, the raw stock from which the faceted diamond is formed included as part of the bruting operation the mounting of the diamond stock by the use of cement, alloys or the like in a holder or dop, as the preliminary step, to submitting the stock to the bruting operation, upon a diamond cutter's lathe.

The lathe head of the lathe includes a chuck for mounting the dop which can be trued to overcome eccentricity. The diamond stock held in the dop by cement, fusible metal or the like is submitted to the operation, as a preliminary step, which includes concentrically positioning the dop in the chuck in order to secure the maximum amount of stock. Thereafter the bruting operation includes rubbing together a diamond held upon a stick against the rapidly revolving stock held in the dop mounted in the lathe head. The labor of cementing the diamond stock to the dop, or holder, is of itself an objectionable and costly procedure by reason of the cost and time element involved.

It is also known to me that efforts have been made mechanically to hold the diamond stock in a dop mounted upon the frictionally held and floating chuck spindle of the diamond cutter's lathe, and to hold the stock in the cement type of dop by the employment of a dead center. This operation is slow and tedious in that the work of centering of the stock requires the release of the dead center pressure to avoid improvident fracture of the diamond stock or loosening of the diamond stock in the dop.

In order to more facilely further the practice of my invention, set forth in my application, Serial Number 437,056, filed March 31, 1942, and to quickly provide a bruted stock so that I may economically practice my invention therein described for the making of diamonds of all sizes, including 20 or more diamonds to the carat, I have provided a holder which mechanically holds the raw stock, permitting the centering upon the diamond cutter's lathe. Accordingly, it is an object of my invention to provide in a diamond cutter's lathe, a dop therefor, whereby the bruting operation may be quickly and facilely practiced and the diamond stock rapidly submitted to the bruting operation.

It is a further object of my invention to provide a diamond cutter's lathe head, or floating chuck spindle, with a dop including means to mechanically hold the diamond stock in position for the bruting operation, permitting rapid centering of the diamond without fear of fracturing the dop parts or loosening the engagement of the stock in the holder or dop.

Still further objects of my invention reside in the provision of a diamond cutter's lathe head, whereby a centering of the diamond stock may be quickly accomplished to economically recover the largest possible size of diamond from the raw stock employed, and which likewise permits of a rapid dismounting of the gem stock from the holder.

Still further objects of my invention reside in the provision of a diamond cutter's lathe head dop which will effect substantial economies in the bruting operation to which diamonds are subjected by reason of the simplicity of this phase of the operation and the elimination of unusually highly skilled labor heretofore employed in performing this phase of the operation.

To attain these objects and such further objects as may appear herein or be hereinafter pointed out, I make reference to the accompanying drawing, forming a part hereof in which:

Fig. 1 is a perspective view illustrating my invention;

Fig. 2 is an enlarged fragmentary sectional view of the lathe head and dop;

Fig. 3 is a section taken on the line 3—3 of Fig. 2; and

Fig. 4 is a section taken on the line 4—4 of Fig. 2.

Making reference to the drawing, there is shown a diamond cutter's lathe 10 having mounted on its live center 11 a chuck 12. This chuck comprises a plate 13 provided with peripheral radial orifices or slots 14 which is held upon the live center by the friction plate 15 through the medium of bolts 16. The floating dop holder or chuck spindle 17 extends through the enlarged opening 18 in the plate 15. This construction, thus far described, is a well known part of a diamond cutter's lathe. Centering of the chuck spindle 17 has heretofore been accomplished by mounting the dop and the diamond stock which it carries upon the chuck spindle 17, and thereafter by tapping the periphery 19 of the chuck 12 until the diamond cutter has centered the stock to the best of his ability on the floating chuck spindle. These features of a lathe used by diamond cutters for many years may be referred to as a diamond cutter's lathe having a floating chuck spindle. This stock or material is generally an octahedral crystal or of other well known shape, one of whose faces is a table-forming facet.

In accordance with my invention, I provide a frame or holder 20, generally U-shaped in contour, one branch of which, 21, is provided with a boring forming a bearing 22. Within this boring there is positioned a shaft 23 which has a bearing surface within the boring 22. A peripheral recess 24 cooperates with a set screw 25, to hold the shaft 23 in position against axial displacement, while permitting free rotation within the boring 22. The shaft 23 is provided with a threaded boring 250 arranged to threadedly engage the threaded portion 26 of the spindle 17 extending from the chuck 12. Keyholes 27 are provided so that a spanner wrench may be used to tighten the shaft 23 upon the spindle 17, as will be readily understood. The shaft 23 has its outer end formed with a flange 28. Behind the flange 28, there is positioned a thrust bearing 29 in the form of a ball bearing and race 30, 31, respectively. Centrally of the shaft 23 at the threaded orifice 32, I provide a quick-acting chuck comprising a threaded lug 33 upon which is mounted a knurled head 34. Axially of the knurled head adjacent the nose 35 a conical boring is formed, arranged to position clutch segments 36, 37. These segments are altered to provide a clearance gap 38. It will be understood that the rotation of the head 34 upon the threaded lug 33 will serve to draw the clutch segments towards each other. With the chuck thus described, I provide interchangeably positionable adapters 39. These adapters, in their various sizes depending upon the size of diamond stock, comprise a generally cylindrical stock, the rear end of which is formed with a centering pin 40 arranged to be centered in the lug 33 and provided with a clearance opening. The adapter 39 has its opposite or forward end formed with a socket 41 terminating adjacent the conical nose 42, thereby providing gem-holding rim 43. This rim 43 may be shaped to conform to the diamond stock, preferably, however, forming internal facets generally to conform to the pyramidal side of the natural octahedral crystal comprising the raw diamond stock where this is used.

With the assembly thus far provided, the diamond stock 44 is nested within the rim or lips 43 so that its pavilion-forming portion is cupped within the boring 41, exposing the table-forming portion. The branch 45 of the frame 20 is formed with a threaded boring 46. Within this boring there is positioned a feed screw 47, which is provided with a knurled flange 48 to facilitate hand turning pressure. The feed screw 47 is formed with a boring 49 within which is sleeved the counterpressure pin 50, having a flat contacting point 51 which is arranged to bear against the table-forming portion of the stock 44. The counterpressure pin 50 is sleeved to rotate and slide freely longitudinally. Its back end 52, which is directed within the boring 49, presses or bears against an elastic cushioning member 53. I prefer to employ a block of live rubber as the cushioning member, although it will be understood that a stiff coiled spring or similar cushioning member may be there positioned.

With the assembly as thus provided, the stock 44, after mounting, by resting the same between the rim or lips 43, is held in position by screwthreading the member 47 towards the chuck. The hardness of the gem permits of considerable tightening action. This coupled with the deformability of the material, of which the adapter 39 is formed, assures rigid clamping action. The flat contacting surface 51 of the counterpressure pin 50 abuts against the table-forming portion of the stock 44 and permits rotation of the chuck in order to perform the turning operations for which the lathe was designed with the high pressure of the counterpressure pin against the stock 44. With the holder thus mounted, centering of the stock may be performed by the operator in the usual way. Trial and error during hand rotation of the lathe head is utilized as will be well understood. The operator taps the chuck plate 12 to reduce the eccentric position of the stock 44 in its chuck to the minimum extent. This operation may be performed without in any way dismounting the diamond stock 44 or without fear of fracture of this stock by reason of the tapping operation. By making the counterpressure pin contacting surface 51 normal to the axial line through the holder, quick axial position or centering of the stock is assured. The tapping to center the diamond holder or dop in respect of the axis of the revolving portion of the lathe in no way disrupts the rigid hold upon the stock. After centering the holder upon the chuck plate 12, the tool rest 54 is moved adjacent the U-shaped branch of the holder 20. An extension finger or arm 55, formed with spaced lugs 56—56, engages the side walls of the holder 20, preventing rotation of this holder, while the lathe rapidly rotates the chuck. The finishing stick, usually carrying a bruting diamond, may thereafter be positioned upon the saddle 57, carried by the tool rest 54 to guide this stick by hand, in order to practice the bruting operation.

By the device described, it will be observed that cementing of the diamond stock in the dop is unnecessary, and resort may be made to a mechanical holder to secure the stock upon the diamond cutter's lathe. Every movement in concentrically positioning the stock upon the live center of the lathe carries with it the pressure pin so that any adjustment planned to concentrically position the live center carrying the chuck will draw with it the pressure member or counterpressure pin 50. This assembled relationship prevents any differential canting action between the live center and the counter-pressure pin, and prevents displacement tending to dislodge the stock from the holder during the centering operation, and during the bruting operation, to form the substantially cylindrical portion of the stock.

By applying the pressure pin with its bearing surface 51 in engagement with the table-forming portion of the stock 44, the greatest possible alignment of the axial line of the gem and the center of the revolving lathe head is secured.

Where sawing or formation of the stock 44 leaves the table forming portion rough, rotation of the pin 50 in its socket or boring 49 is possible to prevent any adverse effect on the mounting or contacting engagement and other suitable rotary bearing means may be provided between the pin 50 and its socket 49.

In the form described, I have referred to an adapter 39, and segmental clutch segments 36, 37. These may be varied in size best to select the size of the adapter 39 to the size of diamond stock, it being understood that a graded number of adapters are provided and the largest size adapter is chosen for the particular diamond stock under treatment so that the maximum amount of frictional contact is secured where the pyramidal portion of the diamond stock engages the rim or lips 43, while still exposing enough of the gem stock to the operator's bruting stick to perform the bruting operation conveniently. The adapter 39, here described, may be used in the form as shown in my application entitled Bezel dop and grinding device, Serial Number 500,775, filed September 1, 1943, and may be used interchangeably with the adapter of my prior application so that a minimum number of adapters will have to be provided by the diamond finishing establishment. It will be understood, however, that variations may be made in the rim or lips as to the configuration of the internal facets, as conditions may be encountered, to accommodate the rim or lips 43 to the particular configuration of the stock which is to be finished.

It will be observed that I have provided in a diamond cutter's lathe, a stock holder or dop, which makes mechanical holding or gripping of the stock possible and permits quick dismounting of the stock, thereby minimizing the labor attendant to performing this important diamond cutting operation.

It will also be observed that I have provided a novel holder, or dop, for diamonds or like stock material, enabling mechanical holding of small stock material of the character of diamonds, whereby the finishing operation may be quickly and accurately performed.

While I have described my invention as having utility in its use as a complete assembly, as shown, it will be understood that novelty is attributed to segregated elements of that invention, and that my invention, as claimed, is not to be limited to the use of the complete assembly, as shown.

Having thus described my invention and illustrated its use, what I claim as new and desire to secure by Letters Patent is:

1. In a diamond cutter's lathe having a chuck with means holding a chuck spindle for adjustment eccentrically for bruting irregularly shaped stock and having means on said spindle for mounting a bruting dop for rotation at bruting speeds, the combination therewith of an arm one end of which carries a counterpressure member having an end for engaging the diamond during rotation thereof, the other end of the arm being journaled for free rotation concentrically with and relative to the chuck spindle and mounted to move in synchronism with the chuck spindle in the adjustment of the chuck spindle in relation to the fixed axis of the chuck.

2. In a diamond cutter lathe having a chuck with means for holding a chuck spindle for adjustment eccentrically for bruting irreguglarly shaped stock and having means on said spindle for mounting a bruting dop for rotation at bruting speeds, the combination therewith comprising a seat on said dop for the diamond exposing a table forming face thereof, an arm one end of which carries a counterpressure pin having an end for contacting the face of the diamond during rotation thereof, the other end of the arm having a bearing journaled for free rotation concentrically with and relative to the chuck spindle and mounted to move in synchronism with the chuck spindle in the adjustment of the chuck spindle in relation to the fixed axis of the chuck.

3. In a diamond cutter's lathe having a chuck holding a chuck spindle for adjustment eccentrically for bruting irregularly shaped diamond stock comprising a pavilion portion and a table forming face, said spindle having means for mounting a bruting dop for rotation at bruting speeds, the combination therewith of an arm one end of which carries a counterpressure pin having an end for engaging the face of the diamond during rotation thereof, the other end of the arm having a bearing journaled for free rotation concentrically with and relative to said chuck spindle and mounted to move in synchronism with the chuck spindle in the adjustment of the chuck spindle in relation to the fixed axis of the chuck, and means for feeding the counterpressure pin toward the dop to hold the diamond under pressure on the dop.

4. In a diamond cutter's lathe in accordance with claim 3 wherein means are included on said lathe to hold said arm against rotation during rotation of the bruting dop.

5. In a diamond cutter's lathe having a chuck including means holding a chuck spindle for adjustment eccentrically, in which said spindle is provided with means for mounting a bruting dop for rotation at bruting speeds, the combination therewith of a counterpressure pin having one end for engaging the diamond during rotation under pressure against the dop, said pin being carried by one branch of a substantially U-shaped arm, the other branch of said arm having a bearing journaled for free rotation concentrically with and relative to said chuck spindle and mounted to move the counterpressure pin in synchronism with the chuck spindle in the adjustment of the chuck spindle in relation to the fixed axis of the chuck.

6. In a diamond cutter's lathe having a chuck including means holding a chuck spindle for adjustment eccentrically, in which said spindle is provided with means for mounting a bruting dop for rotation at bruting speeds, a bruting dop on said spindle having a seat for engaging the pavilion portion of the diamond and to expose a table forming face, the combination therewith of a counterpressure pin having a flat contacting end for engaging a small axial section of the face of the diamond during rotation under pressure against the dop, said pin being carried by one branch of a substantially U-shaped arm, the other branch on said arm being journaled concentrically with said chuck spindle and mounted to move the counterpressure pin in synchronism with the chuck spindle in the adjustment of the chuck spindle in relation to the fixed axis of the chuck, and means on said lathe to restrain said arm during bruting rotation of the lathe.

7. In a diamond cutter's lathe in accordance with claim 6 wherein said counterpressure pin is rotatably carried by said branch of said arm to permit said pin to rotate with the diamond during bruting operations.

8. A diamond bruting dop comprising a holder for a raw diamond to be bruted including means for connection of the holder to an eccentrically adjustable spindle of a diamond cutter's lathe, a bearing on said dop, a substantially U-shaped arm, one branch of which is journaled on said bearing, the other branch of said arm carrying a counterpressure pin having a contacting end for engaging a small axial portion of the diamond and means for feeding said pin towards said dop seat to press the diamond on said seat for engagement therewith during bruting operations.

9. A diamond bruting dop comprising a holder having adjustable jaws between which graded sizes of adapters, each formed with a pavilion seat, may be held to accommodate graded sizes of diamonds, including means for connection of the holder to an eccentrically adjustable spindle of a diamond cutter's lathe, a bearing on said dop, a substantially U-shaped arm, one branch of which is journaled on said bearing, the other branch of said arm carrying a counterpressure pin having a contacting end for engaging a small axial portion of the diamond and means for feeding said pin towards said dop seat to press the diamond on said seat for engagement therewith during bruting operations.

10. A diamond bruting dop in accordance with claim 9 wherein the counterpressure pin has a bearing portion for rotation thereof in respect of the branch of the arm carrying the same.

11. In a diamond cutter's lathe having a chuck holding a chuck spindle for adjustment eccentrically for bruting irregularly shaped diamond stock comprising a pavilion portion and a table forming face, said spindle having means for mounting a bruting dop for rotation at bruting speeds, a bruting dop on said spindle having a seat for engaging the diamond, the combination therewith of a counterpressure pin having an end for engaging the face of the diamond during rotation, said pin being carried by an arm journaled concentrically with said chuck spindle and mounted to move in synchronism with the chuck spindle in the adjustment of the chuck spindle in relation to the fixed axis of the chuck, and means for feeding the counterpressure pin toward the dop to hold the diamond under pressure on the dop.

12. In a diamond cutter's lathe having a chuck holding a chuck spindle for adjustment eccentrically for bruting irregularly shaped diamond stock comprising a pavilion portion and a table forming face, said spindle having means for mounting a bruting dop for rotation at bruting speeds, a bruting dop on said spindle having a seat for engaging the diamond, the combination therewith of a U-shaped arm having one end journalled concentrically with said chuck spindle, the arm being mounted to move in synchronism with the chuck spindle in the adjustment of the chuck spindle in relation to the fixed axis of the chuck, an adjusting plug threaded into the other end of the arm, a counterpressure pin having an end for engaging the face of the diamond during rotation, said pin being mounted for rotation in said adjusting plug and the threaded connection of said plug with the end of said arm constituting means for feeding the counterpressure pin toward the dop to hold the diamond under pressure on the dop.

13. A diamond bruting dop comprising a holder for a raw diamond to be bruted including means for connection of the holder to an eccentrically adjustable spindle of a diamond cutter's lathe, a bearing on said dop, a substantially U-shaped arm, one branch of which is journalled on said bearing, an adjusting plug threaded into the other branch of said arm, a counterpressure pin mounted for rotation in said plug and having a contacting end for engaging a small axial portion of the diamond to press the diamond against said holder when the pressure pin is moved towards the holder by adjusting movement of said plug.

14. In a diamond cutter's lathe having an eccentrically adjustable threaded rotary spindle, the combination with said spindle of a sleeve having a threaded bore for attachment of said sleeve to said spindle, diamond supporting means connected to said sleeve in axial alignment with said spindle, said supporting means presenting an end recess in which the diamond to be cut is seated, a U-shaped holder having one arm thereof mounted on said sleeve and in which said sleeve is free to rotate, an adjusting member arranged for threaded connection to the other arm of said holder and a pressure stud mounted in said holder for axial rotation and adapted to hold a diamond in said seating recess under pressure applied by a threaded movement in one direction of said adjusting member.

JOSEF HILLEL SPIRA.

REFERENCES CITED

The following references are of record in the file of this patent:

UNITED STATES PATENTS

| Number | Name | Date |
|---|---|---|
| 1,636,671 | Anzelewitz | July 19, 1927 |
| 740,902 | Oostendorp | Oct. 6, 1903 |
| 1,583,963 | Donaldson | May 11, 1926 |
| 569,252 | Strasburger | Oct. 13, 1896 |
| 132,763 | Hopkins | Nov. 5, 1872 |
| 1,141,613 | Coffman | June 1, 1915 |
| 445,169 | Friedel | Jan. 27, 1891 |
| 276,084 | Schwarz | Apr. 17, 1883 |
| 2,316,109 | Sclodar | Apr. 6, 1943 |
| 1,105,356 | Ludlow et al. | July 28, 1914 |

FOREIGN PATENTS

| Number | Country | Date |
|---|---|---|
| 500,576 | Great Britain | Feb. 13, 1939 |
| 107,421 | Switzerland | Nov. 1, 1924 |